Feb. 20, 1923.
M. O. REEVES
V-TYPE BELT
Filed May 22, 1922
1,446,018
2 sheets-sheet 1
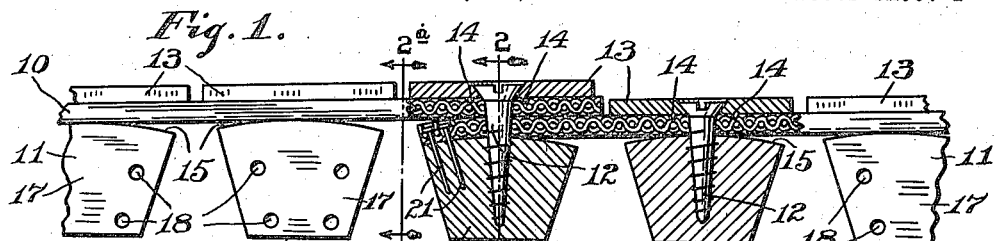
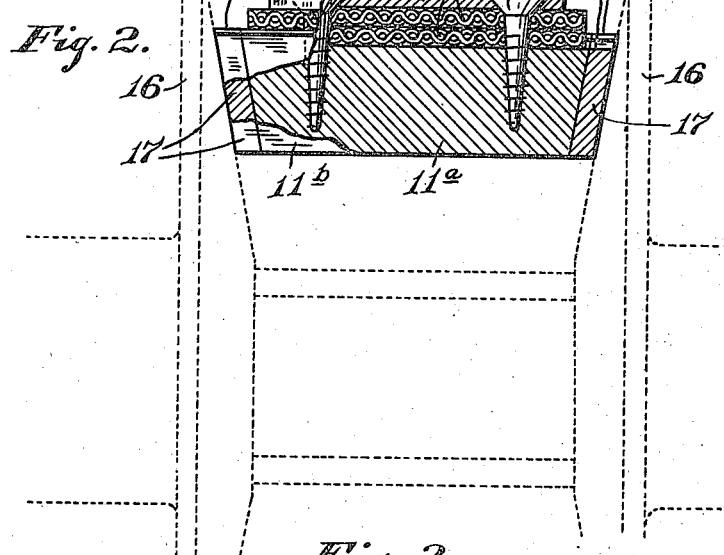
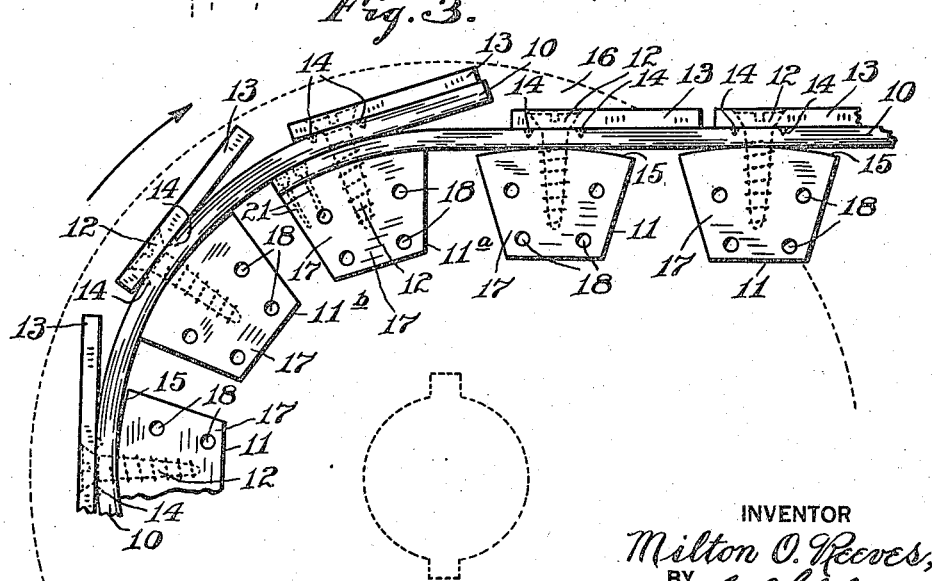
INVENTOR
Milton O. Reeves,
BY
ATTORNEY Feb. 20, 1923.
M. O. REEVES
V-TYPE BELT
Filed May 22, 1922
1,446,018
2 sheets-sheet 2
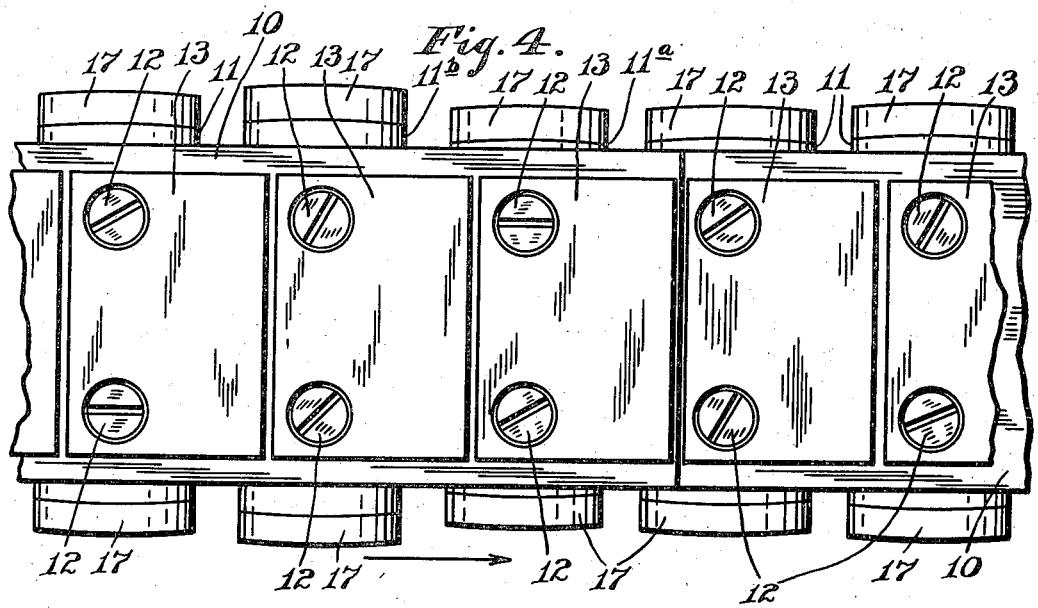
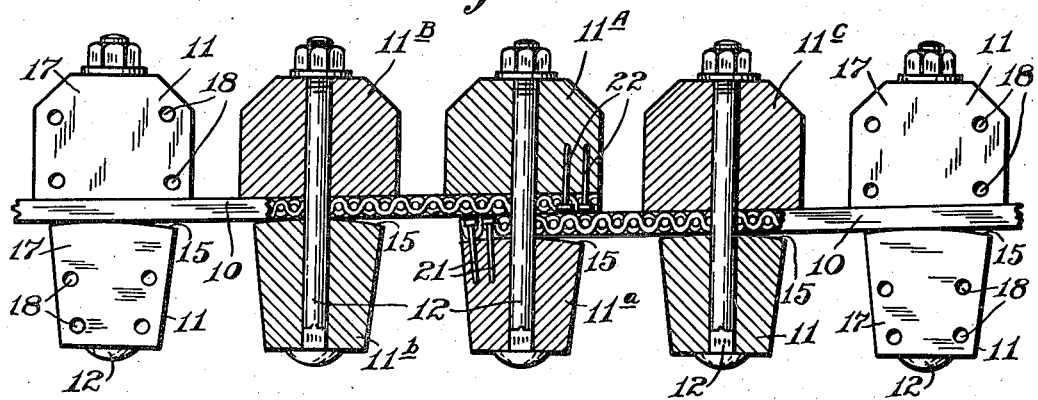
INVENTOR
Milton O. Reeves,
BY
ATTORNEY Patented Feb. 20, 1923.

1,446,018

UNITED STATES PATENT OFFICE.

MILTON O. REEVES, OF COLUMBUS, INDIANA, ASSIGNOR TO REEVES PULLEY CO., OF COLUMBUS, INDIANA, A CORPORATION OF INDIANA.

V-TYPE BELT.

Application filed May 22, 1922. Serial No. 562,647.

*To all whom it may concern:*

Be it known that I, MILTON O. REEVES, a citizen of the United States, residing at Columbus, in the county of Bartholomew and State of Indiana, have invented a new and useful V-Type Belt, of which the following is a specification.

It is the main object of my invention to provide in a V-type cross-bar belt a joint which will have the same strength and the same flexibility as the remainder of the belt and which will not interfere with the frictional contact of the ends of any of the cross-bars with the tapered flanges of the associated pulleys.

In attaining this object, I overlap upon each other over a cross-bar the two ends of the strip of belt material to be interconnected to form the joint, and fasten both of such overlapping ends to such cross-bar, but not to each other save substantially at their line of fastening to such cross-bar, so that they are free to bend independently; and I make such cross-bar below the double thickness of belt material sufficiently shorter at the top than is the neighboring cross-bar which lies beneath only the upper of the two overlapping layers of belt material so that the oblique ends of both of said cross-bars will lie in substantially the same plane; and I prefer to make at least several cross-bars on each side of the two cross-bars above referred to of successively increasing and decreasing lengths at the top, those beneath the layer of belt material which forms the lower layer at the overlap being of successively increasing lengths starting with the one beneath the double thickness of belt material, and those beneath the layer of belt material which forms the upper layer at the overlap being of successively decreasing lengths starting with one next to the joint.

The invention shown in my present application is one specific embodiment of a broad invention which is claimed generically in connection with other specific embodiments thereof in my co-pending application, Serial No. 562,646, of even filing date herewith.

Other features of my invention will appear hereinafter.

The accompanying drawings illustrate my invention: Fig. 1 is a side elevation of a straight portion of a belt embodying my invention, partially in section on a line of attaching screws; Fig. 2 is a section on the line 2—2 of Fig. 1, partly broken away back to the line 2ª—2ª of Fig. 1, with a fragment of an associated taper-flange pulley shown in dotted lines; Fig. 3 is a side elevation of a fragment of a belt embodying a modified form of my invention, shown partly in position around a pulley; Fig. 4 is a plan of a straight portion of the belt shown in Fig. 3; and Fig. 5 is a fragmental side elevation of a form of my invention in which cross-bars are used on both the inside and outside of the belt.

The belt consists fundamentally of a strip of belt material 10, such as leather or woven fabric, attached to a series of spaced cross-bars 11, which may be all on one side of the belt (the inside as shown) as shown in Figs. 1, 2, 3, and 4, or may be in pairs on opposite sides of the belt as shown in Fig. 5. The double-bar arrangement shown in Fig. 5 is an obvious modification, and for simplicity it will in general be sufficient to describe the single-bar arrangement shown in the other figures.

The belt material 10 is fastened to the cross-bars 11 by screws or bolts 12, which are shown as wood screws in Figs. 1 to 4 inclusive and bolts in Fig. 5. In the single-bar arrangement of Figs. 1 to 4 inclusive there are clamping plates 13 on the opposite side of the belt material 10 from the cross-bars 11, and in the double-bar arrangement of Fig. 5 the outer cross-bars serve as and take the place of such clamping plates in addition to their other functions. In order to ease the strain on the screws 12 and on the belt material 10 at the holes for such screws, I provide the belt-engaging faces of the clamping plates 13 with belt-gripping points 14 which bite into the surface of the belt material 10; these are especially desirable at the cross-bar upon which the two thicknesses of belt material overlap, hereinafter particularly referred to. These points are preferably located only close to the line of the two or more screws 12 which fasten each cross-bar 11 to the belt material 10, as is clear from Fig. 1, as only there do the plates 13 remain constantly in contact with such belt material. The outer surfaces 15 of the cross-bars 11 (or of the inner cross-bars in the double-bar arrangement of Fig. 5) are preferably curved, to form segments of cylinders, of sufficiently small radius to correspond with the minimum radius of curvature the belt will have in its operation. The belt material 10 swings into and out of contact with the outer parts of such curved surfaces 15, and of the inner faces of the outer cross-bars in the double-bar arrangement of Fig. 5, as the belt passes from a straight line into a curved line and vice versa.

The clamping plates 13 may be symmetrical with respect to the line of screws 12 on each cross-bar, as is shown in Fig. 1, as is especially suitable for belts in which the direction of travel is reversible; or they may be unsymmetrical with respect to such line, with their projecting edges in advance, as is shown in Figs. 3 and 4, as is suitable for belts which travel only in one direction, so that such projecting edges of the clamping plates will serve to prevent reverse bending of the belt as it is pulled out from between the taper flanges 16 of the pulley. This latter arrangement of clamping plates is specifically claimed per se in my co-pending application, Serial No. 526,573, filed January 3, 1922.

The taper flanges 16 of the pulley are engaged by the ends of the cross-bars 11. Such ends are therefore tapered to correspond to the taper of such flanges, as is clear from Fig. 2; so that by moving the flanges toward or from each other the belt is pushed radially outward or allowed to come radially inward on the pulley, thus varying the effective diameter of the pulley. For getting a proper frictional grip on the pulley flanges, I preferably provide the ends of the cross-bars with frictional faces 17, preferably made of leather held on by tacks 18 as well as by being glued.

To make a joint in this belt, it is desirable that the belt at the joint be of the same strength and flexibility as the remainder of the belt, and that the engagement of the ends 17 of the cross-bars 11 with the pulley flanges 16 be not interfered with. According to my present invention, I overlap the two ends of the strip of belt material over one cross-bar, the cross-bar 11$^a$, so that the attaching screws 12 of such cross-bar pass through the two layers of belt material formed by such overlapping and clamp such two layers together between such cross-bar 11$^a$ and the clamping plate 13. The clamping plate 13 bears against the outer of these two layers, and the belt-gripping points 14 of such clamping plate bite into such outer layer close to the screws 12. The inner layer of belt material over the cross-bar 11$^a$ is preferably attached to such cross-bar by tacks 21, located close to the end of the strip, between such end and the attaching screws 12, as is clear from Fig. 1, to strengthen the attachment and so that the end portion beyond the screws 12 will not bend in operation and will never leave the surface 15 of such cross-bar. In the same way, if desired, in the double-bar arrangement of Fig. 5, the end portion of outer layer of belt material over the cross-bar 11$^a$ may be attached to the cooperating outer cross-bar 11$^A$ by tacks 22, located close to the end of the outer layer, between such end and the attaching bolts 12, as is clear from Fig. 5, as such end portion beyond the bolts 12 does not bend in operation and never needs to leave the inner surface of the cross-bar 11$^A$. The inner layer on the opposite side of the screws or bolts 12 from the tacks 21 swings into and out of engagement with the surface 15 of the cross-bar 11$^a$, but by the bending of only a single thickness of belt material; and the outer layer on the opposite side of the screws or bolts 12 from the tacks 22 swings into and out of engagement with the inner surface of the cross-bar 11 or of the clamping plate 13, and with the outer curved surface of the end portion of the inner layer, but by the bending of only a single thickness of belt material. Thus between the cross-bar 11$^a$ and the adjacent cross-bars, the belt has both the strength and the flexibility of only a single thickness of belt material, for only such a single thickness transmits the pull of the belt, and only such a single thickness bends in the operation of the belt.

If all the cross-bars were of the same dimensions throughout the offsetting between the cross-bar 11$^a$ (or 11$^a$ and 11$^A$) and an adjacent cross-bar on account of the interposition of an extra thickness of belt material over the cross-bar 11$^a$ (and under the cross-bar 11$^A$) would mean the lifting of some of the cross-bars out of engagement with the flanges 16, or at least a tendency to produce such lifting and a resultant necessity for a greater bending of the belt to obtain such engagement. This lifting tendency would exist in the single-bar arrangement of Figs. 1 to 4 for at least the adjacent cross-bar 11$^b$ under the outer strip of belt material; and in the double-bar arrangement shown in Fig. 5 for at least both the pair of cross-bars 11$^a$ and 11$^A$ at the overlap and and the next adjacent pair of cross-bars 11$^b$ and 11$^B$ cooperating with the outer layer of belt material. Therefore, in order that all the cross-bars of the belt may be in proper frictional engagement with the flanges 16, I make the cross-bar 11$^a$ which is below the overlap shorter (transversely of the belt) at its outer surface than is the adjacent cross-bar 11$^b$ lying beneath only the outer layer of belt material forming such overlap; so that such cross-bar 11$^a$ will have its outer surface farther down on the taper flanges 16 of the pulley than is that of the adjacent cross-bar 11$^b$, and the frictional surfaces at the ends of the cross-bar 11$^a$ will be in the same plane when the belt is straight, and on the surface of the same cone when the belt is curved, as are those at the ends of the cross-bar 11$^b$. This is clear from Figs. 1, 2, and 4; the cross-bar 11$^a$ in Fig. 2 being partly broken away at one end to show the adjacent cross-bar 11$^b$ behind it, with the frictional surfaces of such two cross-bars in the same plane.

In the same way, there is a reverse off-setting between the outer cross-bars in the double-bar arrangement, between the outer cross-bar 11$^A$ and the adjacent outer cross-bar 11$^C$ cooperating with the strip forming the inner strip at the point. The inner surface of the cross-bar 11$^C$, therefore, is made sufficiently shorter than the inner surface of the cross-bar 11$^A$ so that the outer ends of such two cross-bars lie in the same plane when the belt is straight, so that both will have proper frictional engagement with the pulley flanges 16.

Thus for both the inner cross-bars and the outer cross-bars, there is a suitable variation in length between the overlapped cross-bar and that adjacent cross-bar which cooperates with that layer of belt material which is spaced from the overlapped cross-bar by an interposed layer of belt material, to compensate for such interposition.

In addition to this offsetting between the inner cross-bars 11$^a$ and 11$^b$, and between the outer cross-bars 11$^A$ and 11$^C$ in the double-bar arrangement, I prefer to make a gradual variation in cross-bar length at the belt-adjacent surface for at least several cross-bars on each side of the overlap. Theoretically, this gradual variation should extend completely around the belt, starting for the inner cross-bars with the cross-bar 11$^a$ as the shortest on its outer surface and having the cross-bars of gradually increasing length to the right (Figs. 1 and 4) around the belt until the inner cross-bar 11$^b$ is reached, where the length of the outer surface of the cross-bar is the greatest. In practice, however, I find it sufficient if this gradual variation is continued only for several cross-bars, preferably on each side of the overlap, although good results can be obtained if the gradual variation is on only one side of the overlap and continues for several cross-bars until a cross-bar length is reached substantially corresponding to that at the other end of the entire series of cross-bars. In the arrangement indicated, the cross-bar 11$^a$ is the shortest of the inner cross-bars, with respect to its outer surface, and the cross-bars toward the right (Figs. 1, 3, 4, and 5) are of gradually increasing length on their outer surface; and the cross-bar 11$^b$ is the longest of the inner cross-bars, with respect to its outer surface, and the cross-bars toward the left are of gradually decreasing length on their outer surface. In the same way, where outer cross-bars are used, as in Fig. 5, the cross-bar 11$^A$ has the longest inner surface, and the inner surfaces shorten for successive cross-bars toward the left (Fig. 5); and the outer cross-bar 11$^C$ has the shortest inner surface, and such inner surfaces lengthen for successive cross-bars toward the right.

By this arrangement, the joint is made in either the single-bar arrangement or the double-bar arrangement without interfering with the proper frictional engagement of the ends of all the cross-bars with the pulley flanges, and without requiring any greater bending of the belt at one point than at another, while still maintaining the belt of uniform strength and uniform flexibility throughout its length.

I claim as my invention:

1. A V-type cross-bar belt, comprising a strip of belt material, and a plurality of cross-bars attached to said strip at spaced points along it and having oblique ends, the end portions of said strip overlapping each other over one of said cross-bars while over an adjacent cross-bar there is only the single thickness of belt material formed by a continuation of the end portion which is spaced from the overlapped cross-bar by the interposition of the other end portion, the cross-bar on which said overlapping occurs being of different length transversely to the strip on its strip-engaging face than is said adjacent cross-bar, said difference in length being sufficient so that the oblique ends of the two cross-bars lie in substantially the same plane when the belt is straight.

2. A V-type cross-bar belt, comprising a strip of belt material, and a plurality of cross-bars attached to said strip at spaced points along it and having oblique ends, the end portions of said strip overlapping each other over one of said cross-bars while over an adjacent cross-bar there is only the single thickness of belt material formed by a continuation of the end portion which is spaced from the overlapped cross-bar by the interposition of the other end portion, the cross-bar on which said overlapping occurs being shorter transversely of the belt on its strip-engaging face than is said adjacent cross-bar, said difference in length being sufficient so that the oblique ends of the two cross-bars lie in substantially the same plane when the belt is straight.

3. A V-type cross-bar belt, comprising a strip of belt material, a plurality of cross-bars attached to said strip at spaced points along it and having oblique ends, the end portions of said strip overlapping each other over one of said cross-bars while over an adjacent cross-bar there is only the single thickness of belt material formed by a continuation of the end portion which is spaced from the overlapped cross-bar by the interposition of the other end portion, the cross-bar on which said overlapping occurs being of different length transversely to the strip on its strip-engaging face than is said adjacent cross-bar, and a clamping plate associated with each cross-bar and between which and the associated cross-bar the layer or layers of belt material at such cross-bar are clamped.

4. A V-type cross-bar belt, comprising a strip of belt material, a plurality of cross-bars attached to said strip at spaced points along it and having oblique ends, the end portions of said strip overlapping each other over one of said cross-bars while over an adjacent cross-bar there is only the single thickness of belt material formed by a continuation of the end portion which is spaced from the overlapped cross-bar by the interposition of the other end portion, the cross-bar on which said overlapping occurs being of different length transversely to the strip on its strip-engaging face than is said adjacent cross-bar, and a clamping plate associated with each cross-bar and between which and the associated cross-bar the layer or layers of belt material at such cross-bar are clamped, said clamping plates being provided with projecting points for penetrating the belt material.

5. A V-type cross-bar belt, comprising a strip of belt material, a plurality of cross-bars attached to said strip at spaced points along it and having oblique ends, the end portions of said strip overlapping each other over one of said cross-bars while over an adjacent cross-bar there is only the single thickness of belt material formed by a continuation of the end portion which is spaced from the overlapped cross-bar by the interposition of the other end portion, the cross-bar on which said overlapping occurs being of different length transversely to the strip on its strip-engaging face than is said adjacent cross-bar, and a clamping plate associated with the cross-bar on which the two end portions overlap, said cross-bar and said clamping plate lying on opposite sides of the two overlapping layers of belt material so that said two layers are clamped between said cross-bar and said clamping plate.

6. A V-type cross-bar belt, comprising a strip of belt material, a plurality of cross-bars attached to said strip at spaced points along it and having oblique ends, the end portions of said strip overlapping each other over one of said cross-bars while over an adjacent cross-bar there is only the single thickness of belt material formed by a continuation of the end portion which is spaced from the overlapped cross-bar by the interposition of the other end portion, the cross-bar on which said overlapping occurs being of different length transversely to the strip on its strip-engaging face than is said adjacent cross-bar, and a clamping plate associated with the cross-bar on which the two end portions overlap, said cross-bar and said clamping plate lying on opposite sides of the two overlapping layers of belt material so that said two layers are clamped between said cross-bar and said clamping plate, said clamping plate being provided with projecting points for penetrating the belt material of the end portion against which it bears.

7. A V-type cross-bar belt, comprising a strip of belt material, and a plurality of cross-bars attached to said strip at spaced points along it and having oblique ends, the end portions of said strip overlapping each other over one of said cross-bars while over an adjacent cross-bar there is only the single thickness of belt material formed by a continuation of the end portion which is spaced from the overlapped cross-bar by the interposition of the other end portion, the cross-bar on which said overlapping occurs being of different length transversely to the strip on its strip-engaging face than is said adjacent cross-bar, the end portion directly engaging the cross-bar over which the overlapping occurs being attached permanently against the surface of said cross-bar between the middle line of the cross-bar and the extreme end of such end portion.

8. A V-type cross-bar belt, comprising a strip of belt material, and a plurality of cross-bars attached to said strip at spaced points along it and having oblique ends, the end portions of said strip overlapping each other over one of said cross-bars while over an adjacent cross-bar there is only the single thickness of belt material formed by a continuation of the end portion which is spaced from the overlapped cross-bar by the interposition of the other end portion, the cross-bar on which said overlapping occurs being shorter transversely of the belt on its strip-engaging face than is said adjacent cross-bar, the outer strip-engaging faces of said cross-bars being curved, and the inner end-portion at the overlap being permanently attached to the overlapped cross-bar on that part of the curved surface which lies between the middle of said curved surface and the extreme end of said end portion.

9. A V-type cross-bar belt, comprising a strip of belt material having its ends overlapping, a plurality of cross-bars at spaced points along said strip with one cross-bar overlapped by both overlapping end portions of the strip so that there are two layers of belt material on that cross-bar, said cross-bars having oblique ends for co-operation with a tapered pulley, and the overlapped cross-bar and an adjacent cross-bar being of different lengths on their strip-engaging faces.

10. A V-type cross-bar belt, comprising a strip of belt material having its ends overlapping, a plurality of cross-bars at spaced points along said strip with one cross-bar overlapped by both overlapping end portions of the strip so that there are two layers of belt material on that cross-bar, said cross-bars having oblique ends for co-operation with a tapered pulley, and the cross-bars near said overlap in at least one direction therefrom being of gradually varying lengths on their strip-engaging faces.

11. A V-type cross-bar belt, comprising a strip of belt material having its ends overlapping, a plurality of cross-bars at spaced points along said strip with one cross-bar overlapped by both overlapping end portions of the strip so that there are two layers of belt material on that cross-bar, said cross-bars having oblique ends for co-operation with a tapered pulley, the cross-bar over which the end portions of said strip overlap being shorter transversely of the belt on its strip-engaging face than is the adjacent cross-bar which co-operates with only the outer of the two overlapping layers on the first cross-bar to compensate for the interposed layers on the first cross-bar.

12. A V-type cross-bar belt, comprising a strip of belt material having its ends overlapping, a plurality of cross-bars at spaced points along said strip with one cross-bar overlapped by both overlapping end portions of the strip so that there are two layers of belt material on that cross-bar, said cross-bars having oblique ends for co-operation with a tapered pulley, the cross-bar over which the end portions of said strip overlap being shorter transversely of the belt on its strip-engaging face than is the adjacent cross-bar which co-operates with only the outer of the two overlapping layers on the first cross-bar to compensate for the interposed layer on the first cross-bar, cross-bars near said overlap on at least one side thereof being of gradually varying lengths on their strip-engaging faces.

13. A V-type cross-bar belt, comprising a strip of belt material having its ends overlapping, a plurality of cross-bars at spaced points along said strip with one cross-bar overlapped by both overlapping end portions of the strip so that there are two layers of belt material on that cross-bar, said cross-bars having oblique ends for co-operation with a tapered pulley, the cross-bar over which the end portions of said strip overlap being shorter transversely of the belt on its strip-engaging face than is the adjacent cross-bar which co-operates with only the outer of the two overlapping layers on the first cross-bar to compensate for the interposed layer on the first cross-bar, a plurality of said cross-bars being of gradually varying lengths on their strip-engaging faces to divide up the difference in length between said two adjacent cross-bars.

14. A V-type cross-bar belt, comprising a strip of belt material having its ends overlapping, a plurality of cross-bars at spaced points along said strip with one cross-bar overlapped by both overlapping end portions of the strip so that there are two layers of belt material on that cross-bar, said cross-bars having oblique ends for co-operation with a tapered pulley, the cross-bar over which the end portions of said strip overlap being shorter trasversely of the belt on its strip-engaging face than is the adjacent cross-bar which co-operates with only the outer of the two overlapping layers on the first cross-bar to compensate for the interposed layer on the first cross-bar, a plurality of cross-bars near the end of the strip of belt material which forms the lower layer at the overlap being of gradually increasing lengths on their strip-engaging faces as they progress further from such end.

15. A V-type cross-bar belt, comprising a strip of belt material having its ends overlapping, a plurality of cross-bars at spaced points along said strip with one cross-bar overlapped by both overlapping end portions of the strip so that there are two layers of belt material on that cross-bar, said cross-bars having oblique ends for co-operation with a tapered pulley, the cross-bar over which the end portions of said strip overlap being shorter transversely of the belt on its strip-engaging face than is the adjacent cross-bar which co-operates with only the outer of the two overlapping layers on the first cross-bar to compensate for the interposed layer on the first cross-bar, a plurality of cross-bars near the end of the strip of belt material which forms the upper layer at the overlap being of gradually decreasing lengths on their strip-engaging faces as they progress further from such end, starting at the cross-bar next to the overlapped cross-bar.

16. A V-type cross-bar belt, comprising a strip of belt material having its ends overlapping, a plurality of cross-bars at spaced points along said strip with one cross-bar overlapped by both overlapping end portions of the strip so that there are two layers of belt material on that cross-bar, said cross-bars having oblique ends for co-operation with a tapered pulley, the cross-bar over which the end portions of said strip overlap being of different length transversely of the belt on its strip-engaging face than is the adjacent cross-bar which co-operates with only the layer of belt material which at the overlap is spaced from the overlapped cross-bar by the other layer of belt material.

17. A V-type cross-bar belt, comprising a strip of belt material having its ends overlapping, a plurality of cross-bars at spaced points along said strip with one cross-bar overlapped by both overlapping end portions of the strip so that there are two layers of belt material on that cross-bar, said cross-bars having oblique ends for co-operation with a tapered pulley, the cross-bar over which the end portions of said strip overlap being of different length transversely of the belt on its strip-engaging face than is the adjacent cross-bar which co-operates with only the layer of belt material which at the overlap is spaced from the overlapped cross-bar by the other layer of belt material, a plurality of said cross-bars being of gradually varying lengths on their strip-engaging faces to divide up the difference in length between said two adjacent cross-bars.

In witness whereof, I have hereunto set my hand at Indianapolis, Indiana, this 20th day of May, A. D. one thousand nine hundred and twenty-two.

MILTON O. REEVES.